(12) United States Patent
Kudo

(10) Patent No.: US 11,904,860 B2
(45) Date of Patent: Feb. 20, 2024

(54) TRAVELING CONTROL APPARATUS FOR VEHICLE

(71) Applicant: SUBARU CORPORATION, Tokyo (JP)

(72) Inventor: Shinya Kudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 170 days.

(21) Appl. No.: 17/306,596

(22) Filed: May 3, 2021

(65) Prior Publication Data

US 2021/0387622 A1 Dec. 16, 2021

(30) Foreign Application Priority Data

Jun. 11, 2020 (JP) .................. 2020-101497

(51) Int. Cl.
*B60W 20/20* (2016.01)
*B60W 30/165* (2020.01)
*B60K 6/26* (2007.10)

(52) U.S. Cl.
CPC .......... *B60W 30/165* (2013.01); *B60W 20/20* (2013.01); *B60K 6/26* (2013.01);
(Continued)

(58) Field of Classification Search
CPC ............... B60W 30/165; B60W 20/20; B60W 2552/05; B60W 2554/4045;
(Continued)

(56) References Cited

U.S. PATENT DOCUMENTS

2017/0361841 A1* 12/2017 Kojo .................. B60W 30/17
2020/0108827 A1* 4/2020 Kanoh ............... B60W 30/165

FOREIGN PATENT DOCUMENTS

| JP | 2010-143551 A | | 7/2010 |
| JP | 2019116182 A | * | 7/2019 |
| WO | WO-2021205192 A1 | * | 10/2021 |

OTHER PUBLICATIONS

Autonomous light vehicle market review and forecasts to 2034-2020 Q2 Edition: Issues versus benefits Anonymous. just - auto. (Apr. 2020). (Year: 2020).q*

(Continued)

*Primary Examiner* — Russell Frejd
*Assistant Examiner* — Chanmin Park
(74) *Attorney, Agent, or Firm* — Rimon P.C.; Tomoki Tanida

(57) ABSTRACT

A control apparatus for a vehicle includes a preceding vehicle detector, a course change predictor, an oncoming vehicle detector, an oncoming-vehicle arrival-time calculator, a crossing predictor, and a following-control corrector. The course change predictor predicts a course change of a preceding vehicle detected by the preceding vehicle detector in a direction crossing an oncoming lane. When the course change is predicted, the oncoming-vehicle arrival-time calculator calculates an estimated arrival time of an oncoming vehicle detected by the oncoming vehicle detector to the preceding vehicle. The crossing predictor compares the estimated arrival time with a necessary crossing time, and predicts, when the estimated arrival time is shorter than the necessary crossing time, that the preceding vehicle will not travel across the oncoming lane. When it is predicted that the preceding vehicle will not travel across the oncoming lane, the following-control corrector lowers a deceleration or acceleration rate of the vehicle.

4 Claims, 8 Drawing Sheets

(52) U.S. Cl.
CPC . *B60W 2552/05* (2020.02); *B60W 2554/4045* (2020.02); *B60W 2754/30* (2020.02); *B60W 2754/50* (2020.02); *B60Y 2200/92* (2013.01); *B60Y 2300/182* (2013.01)

(58) Field of Classification Search
CPC ......... B60W 2754/30; B60W 2754/50; B60W 20/40; B60W 30/18154; B60W 2510/244; B60W 2520/10; B60W 2720/106; B60W 30/16; B60W 60/0027; B60K 6/26; B60Y 2200/92; B60Y 2300/182
See application file for complete search history.

(56) References Cited

OTHER PUBLICATIONS

Translation of JP-2019116182-A (Year: 2019).*

\* cited by examiner

TRAVELING CONTROL APPARATUS FOR VEHICLE

CROSS-REFERENCE TO RELATED APPLICATIONS

The present application claims priority from Japanese Patent Application No. 2020-101497 filed on Jun. 11, 2020 the entire contents of which are hereby incorporated by reference.

BACKGROUND

The technology relates to a vehicle traveling processor.

Adaptive cruise control (ACC) for a vehicle has been known that causes, when no preceding vehicle is detected in front of the vehicle, the vehicle to travel at a set vehicle speed, and causes, when a preceding vehicle is detected in front of the vehicle, the vehicle to travel following the preceding vehicle at a speed lower than or equal to the set vehicle speed.

SUMMARY

An aspect of the technology provides a control apparatus for a vehicle, the traveling control apparatus. The traveling control apparatus includes a preceding vehicle detector, a course change predictor, an oncoming vehicle detector, an oncoming-vehicle arrival-time calculator, a crossing predictor, and a following-control corrector. The preceding vehicle detector is configured to detect a preceding vehicle to be followed by the vehicle. The course change predictor is configured to predict a course change of the preceding vehicle in a direction crossing an oncoming lane. The oncoming vehicle detector is configured to detect an oncoming vehicle traveling on the oncoming lane and approaching the preceding vehicle. The oncoming-vehicle arrival-time calculator is configured to calculate an estimated arrival time of the oncoming vehicle to a position of the preceding vehicle in a case where the course change predictor predicts the course change of the preceding vehicle and where the oncoming vehicle detector detects the oncoming vehicle approaching the preceding vehicle. The crossing predictor is configured to compare the estimated arrival time calculated by the oncoming-vehicle arrival-time calculator with a necessary crossing time necessary for the preceding vehicle to travel across the oncoming lane. In a case where the estimated arrival time is shorter than the necessary crossing time, The crossing predictor is configured to predict that the preceding vehicle will not travel across the oncoming lane. The following-control corrector is configured to lower a deceleration rate or an acceleration rate of the vehicle approaching the preceding vehicle in a case where the crossing predictor predicts that the preceding vehicle will not travel across the oncoming lane.

An aspect of the technology provides traveling control apparatus for a vehicle. The traveling control apparatus for a vehicle includes circuitry. The circuitry is configured to detect a preceding vehicle to be followed by an vehicle. The circuitry is configured to predict a course change of the preceding vehicle in a direction crossing an oncoming lane. The circuitry is configured to detect an oncoming vehicle traveling on the oncoming lane and approaching the preceding vehicle. The circuitry is configured to calculate an estimated arrival time of the oncoming vehicle to a position of the preceding vehicle in a case where the course change of the preceding vehicle is predicted and where the oncoming vehicle approaching the preceding vehicle is detected. The circuitry is configured to compare the estimated arrival time with a necessary crossing time necessary for the preceding vehicle to travel across the oncoming lane. In a case where the estimated arrival time is shorter than the necessary crossing time, the circuitry is configured to predict that the preceding vehicle will not travel across the oncoming lane. The circuitry is configured to lower a deceleration rate or an acceleration rate of the vehicle approaching the preceding vehicle in a case where it is predicted that the preceding vehicle will not travel across the oncoming lane.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
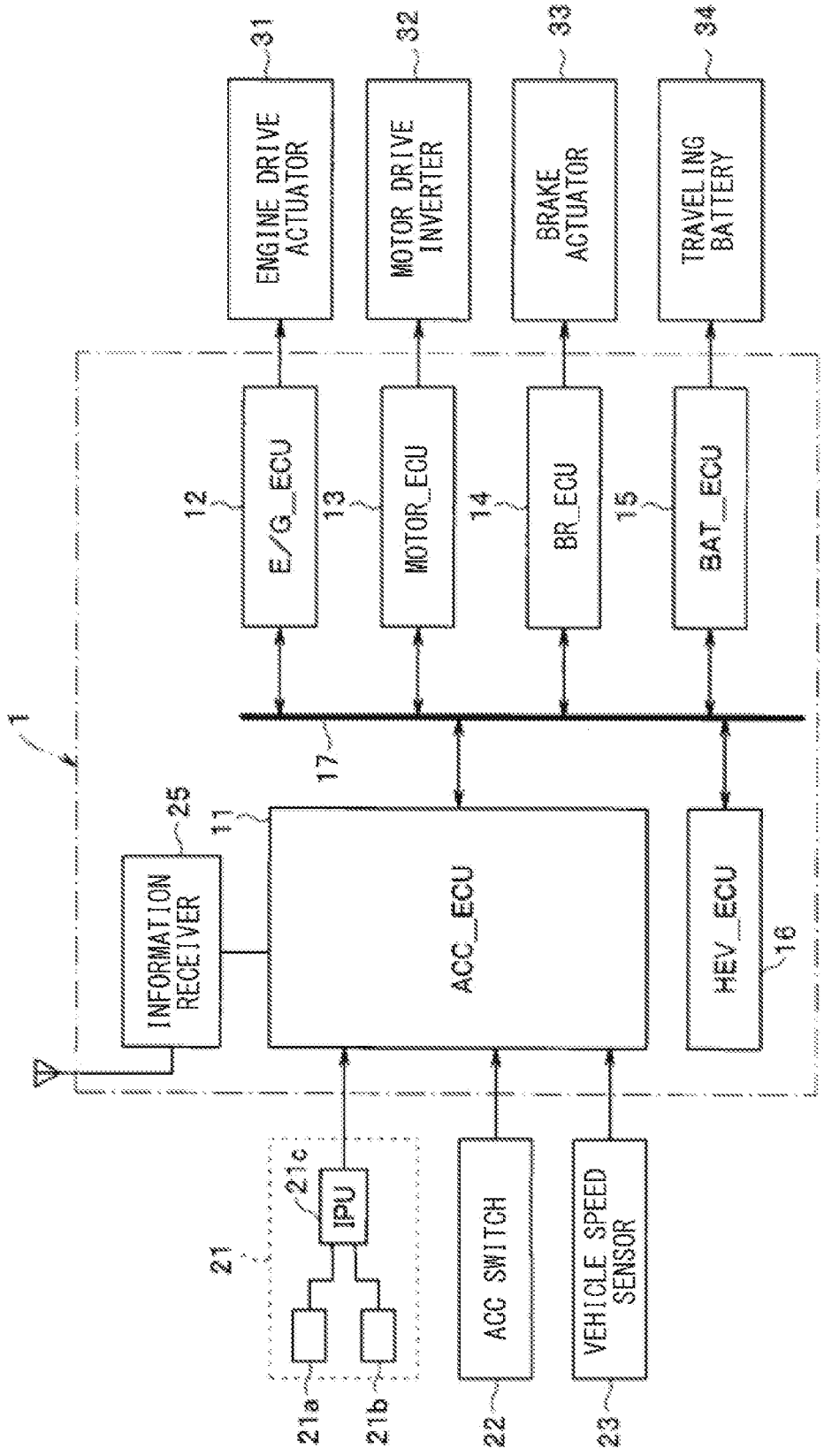
FIG. 1 is a schematic block diagram of an exemplary configuration of a traveling processor according to an example embodiment of the technology.

Recently, an ACC system with an all-speed following function (hereinafter referred to as an all-speed ACC) has been widely used. The all-speed ACC system makes it possible to cause a vehicle to travel at a low speed following a preceding vehicle not only on a limited highway but also an ordinary road. The all-speed ACC thus makes it possible to reduce the burden of driving operations on the driver at the time of traffic congestion, for example.

Such an all-speed ACC system changes a vehicle speed of the vehicle in accordance with a change in the vehicle speed of the preceding vehicle followed by the vehicle to keep an inter-vehicle distance constant. However, if the vehicle speed of the vehicle is changed in accordance with a large change in the vehicle speed of the preceding vehicle caused by repeated accelerations and decelerations of the preceding vehicle during the operation of the all-speed ACC system, the fuel economy of the vehicle can decrease.

To address such a concern, a technique disclosed in Japanese Unexamined Patent Application Publication (JP-A) No. 2010-143551 interrupts following travel control in a case where the all-speed ACC system detects a preceding vehicle to be followed by a vehicle equipped with the all-speed ACC system and where the all-speed ACC system detects a change in vehicle speed of the preceding vehicle higher than a threshold, and resets an average vehicle speed of the preceding vehicle as a target vehicle speed.

According to the technique disclosed in JP-A No. 2010-143551, the all-speed ACC system maintains the vehicle speed of the vehicle on the basis of the reset target vehicle speed. This helps prevent the vehicle from being accelerated or decelerated in accordance with the change in speed of the preceding vehicle, and thus suppresses a decrease in the fuel economy of the vehicle.

For example, in a case where a traffic light indicates a stop sign and where the preceding vehicle to be followed by the vehicle starts decelerating to stop at a stop line before an intersection, the all-speed ACC system of the vehicle decelerates the vehicle following the preceding vehicle in accordance with the deceleration of the preceding vehicle and gradually shortens a target inter-vehicle distance between the preceding vehicle and the vehicle on the basis of a relative vehicle speed between the vehicle and the preceding vehicle and the vehicle speed of the preceding vehicle or the vehicle speed of the vehicle.

In a case where the preceding vehicle to be followed by the vehicle is decreasing at a constant deceleration rate to stop before an intersection, the technique disclosed in JP-A No. 2010-143551 decelerates the vehicle in accordance with the constant speed change of the preceding vehicle, and at the same time, gradually shortens the target inter-vehicle distance between the preceding vehicle and the vehicle to cause the vehicle to stop smoothly following the preceding vehicle.

However, in a case where the preceding vehicle is traveling on a left-sided traveling road and is going to turn right at an intersection by traveling across an oncoming lane, the all-speed ACC system of the vehicle finds it difficult to definitely determine if the preceding vehicle will make a temporary stop at the intersection or will turn right without making a temporary stop at the intersection.

For example, it is possible to slowly decelerate the vehicle at an early timing and thus improve the fuel economy and the ride quality of the vehicle by predicting whether the preceding vehicle will turn right after making a temporary stop at the intersection. Further, in a case where it is predict that the preceding vehicle will turn right without making a temporary stop at the intersection, it possible to suppress a decrease in the fuel economy and the ride quality of the vehicle by causing the vehicle to travel following the preceding vehicle without making a large deceleration of the vehicle.

However, the technique disclosed in JP-A No. 2010-143551 finds it difficult to definitely predict if the preceding vehicle will make a temporary stop at the intersection or turn right without making a temporary stop at the intersection. Thus, the technique still has room for further improvement in the fuel economy.

It is desirable to provide a vehicle traveling processor that makes it possible to improve the fuel economy and the ride quality of a vehicle by predicting if a preceding vehicle will change its course by traveling across an oncoming lane after making a temporary stop at the intersection or change its course without making a temporary stop at the intersection, and to execute the ACC in accordance with the prediction.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

First Example Embodiment

Figure 5:
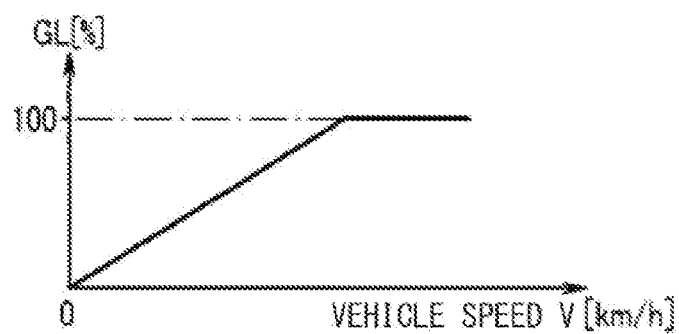
FIG. 5 is a conceptual diagram illustrating a slow deceleration correction gain setting table according to an example embodiment of the technology.
Figure 6:
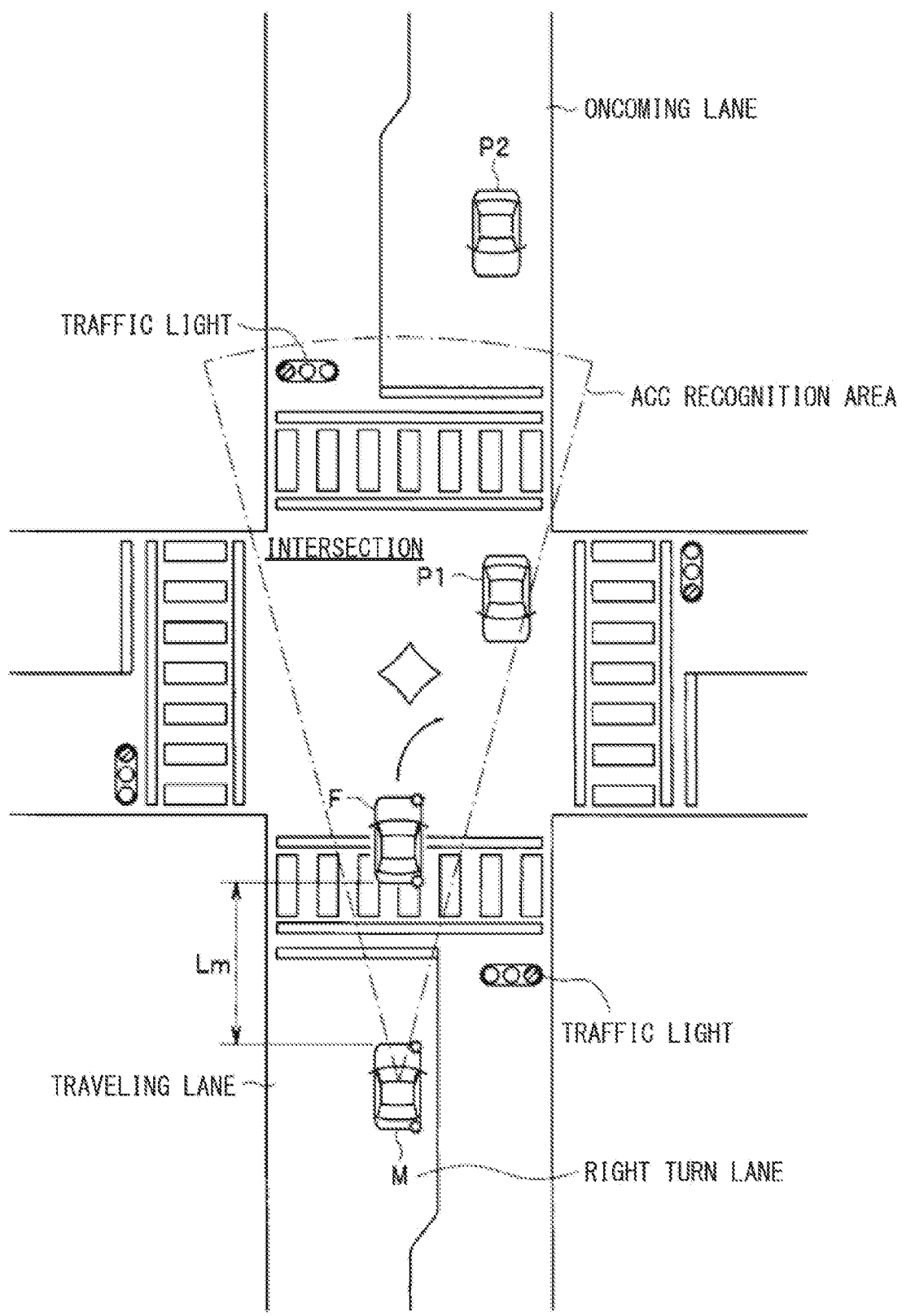
FIG. 6 is an explanatory diagram illustrating an exemplary movement of a vehicle to which the embodiment is applied going to turn right following the preceding vehicle going to turn right at an intersection.

A first example embodiment of the technology will now be described with reference to FIGS. 1 to 8. FIG. 6 illustrates a vehicle M to which the first example embodiment is applied, a preceding vehicle F, and oncoming vehicles P1 and P2 that are entering an intersection. The preceding vehicle F is traveling immediately in front of the vehicle M and detected as a vehicle to be followed by the vehicle M. The oncoming vehicles P1 and P2 are traveling on an oncoming lane. In the first example embodiment, descriptions are made assuming that the vehicles are traveling on left-sided traveling roads and that the preceding vehicle F and the vehicle M will change their course to the right by traveling across the oncoming lane, for convenience of explanation. The following descriptions may also be applied to right-sided traveling roads by reversing left and right.

Figure 7:
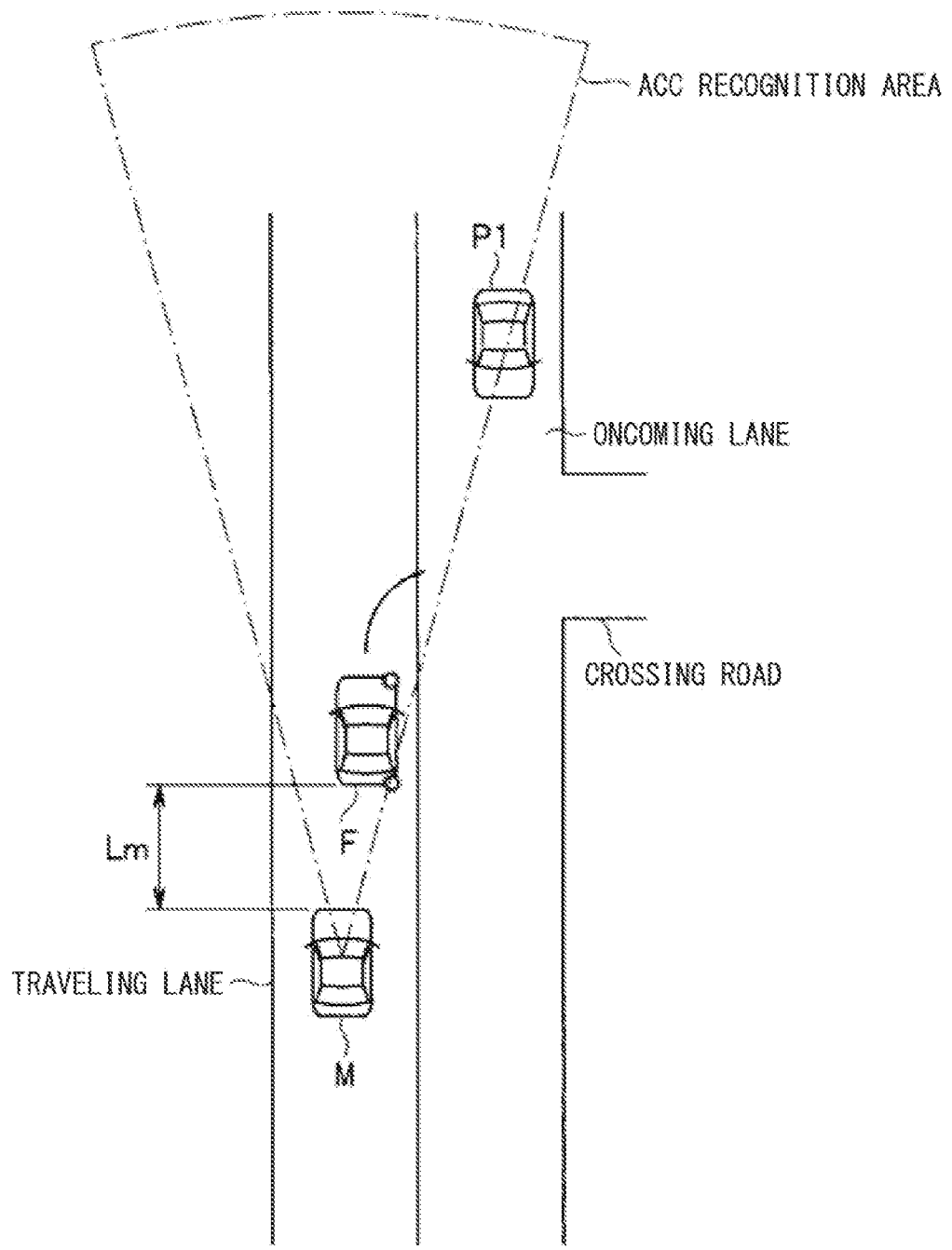
FIG. 7 is an explanatory diagram illustrating an example situation where the preceding vehicle is going to turn right after making a temporary stop whereas the vehicle following the preceding vehicle is going to travel straight.
Figure 8:
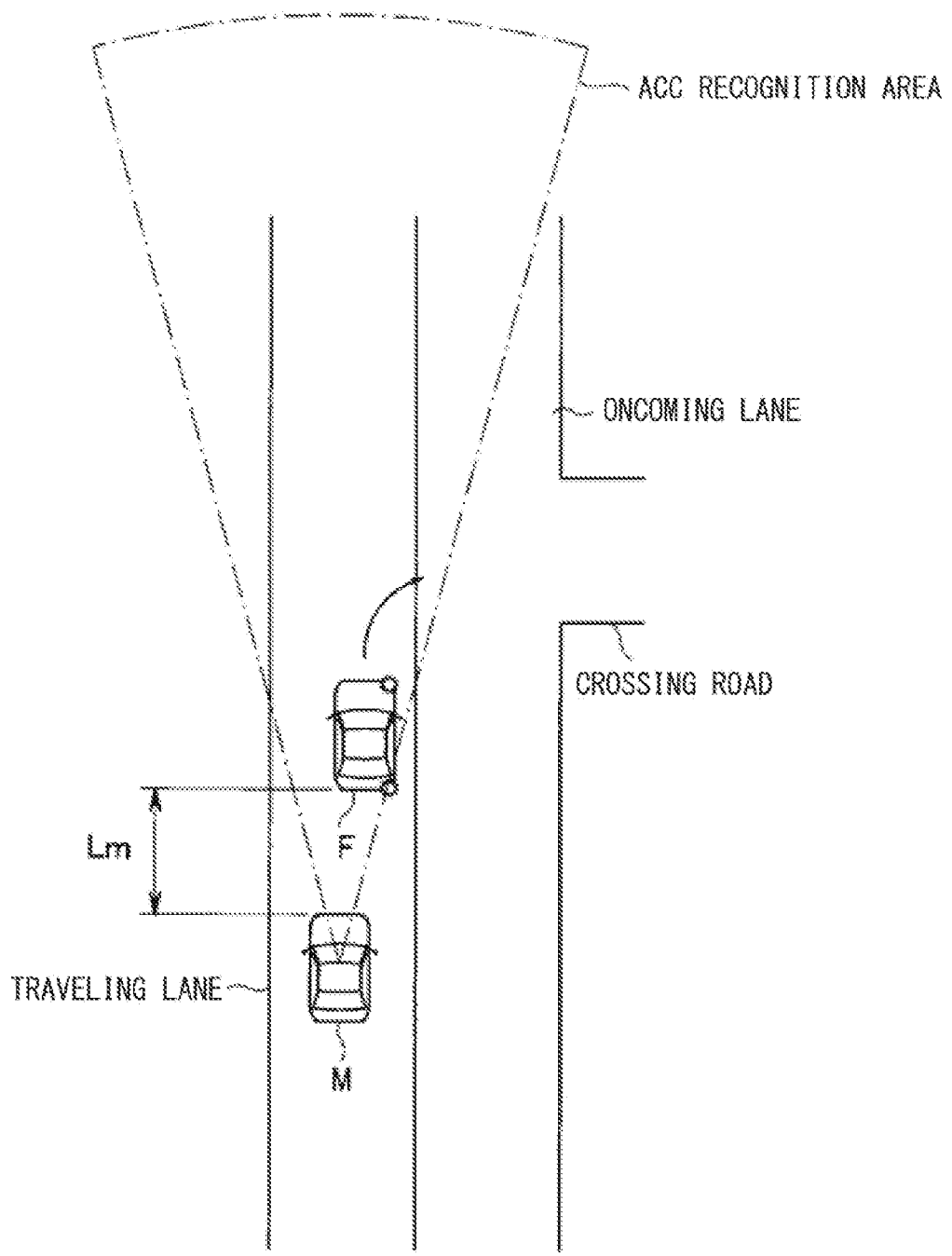
FIG. 8 is an explanatory diagram illustrating an example situation where the preceding vehicle is going to turn right without making a temporary stop whereas the vehicle following the preceding vehicle is going to travel straight.

Herein, the "intersection" may be provided at a crossing between a crossing road and the traveling lane of the vehicle M that is adjacent to an oncoming lane in plan view. The intersection may be provided at any location other than the cross road illustrated in FIG. 6. For example, the intersection may be provided at a T-junction as illustrated in FIGS. 7 and 8 or a junction of five or more roads. The crossing road crossing the traveling lane of the vehicle M may be, for example but not limited to, an ordinary vehicle road or an entrance of a parking space of a commercial facility.

In FIG. 6, the preceding vehicle F and the vehicle M are going to enter the intersection from a right-turn lane of the traveling lane to change its course to the right (i.e., turn right). The oncoming vehicles P1 and P2 are going to travel straight on the oncoming lane through the intersection. In FIG. 7, the preceding vehicle F is making a temporary stop to wait for the oncoming vehicle P1 to pass through the intersection before changing its course to the right, and the vehicle M is making a temporary stop following the preceding vehicle F before traveling straight through the intersection. In FIG. 8, the preceding vehicle F is turning (i.e., changing its course) to the right without making a temporary stop, whereas the vehicle M is going to travel straight.

The vehicle M illustrated in FIGS. 6 to 8 may be a hybrid vehicle including an engine and a traveling motor as drive sources. The vehicle M may further include a traveling processor 1 illustrated in FIG. 1. The traveling processor 1 may adjust the vehicle speed by controlling operations of a non-illustrated engine, a non-illustrated traveling motor, and a non-illustrated brake.

The traveling processor 1 may include various control units such as an ACC unit (hereinafter referred to as an ACC_ECU) 11, an engine control unit (hereinafter referred to as an E/G_ECU) 12, a motor control unit (hereinafter referred to as a motor_ECU) 13, a brake control unit (hereinafter referred to as a Br_ECU) 14, a battery control unit (hereinafter referred to as a BAT_ECU) 15, and a hybrid control unit (hereinafter referred to as an HEV_ECU).

These control units 11 to 16 may be coupled to each other to mutually communicate with each other via an in-vehicle communication line 17, which may be a controller area network (CAN), for example. These control units 11 to 16 may each include a known microcomputer including a CPU, a ROM, a RAM, and so forth. The ROM may store control programs that operate the CPU, and fixed data, such as table data, for each system.

A camera unit 21 may be coupled to an input terminal of the ACC_ECU 11. The camera unit 21 may be a stereo camera including a main camera 21a and a sub-camera 21b. The main camera 21a and the sub-camera 21b may capture an analog image of a surrounding environment in front of the vehicle M. The analog image of the surrounding environment may be subjected to predetermined image processing in an image processing unit (IPU) 21c, and the processed image may be transmitted to the ACC_ECU 11 as front environment information.

Additionally, various sensors, such as an ACC switch 22, a vehicle speed sensor 23, and an information receiver 25, may be coupled to the input terminal of the ACC_ECU 11. These sensors coupled to the input terminal of the ACC_ECU 11 may acquire various pieces of information necessary to cause the vehicle M to travel at a set, constant vehicle speed or travel following a preceding vehicle. For example, the vehicle speed sensor 23 may detect a vehicle speed of the vehicle M (hereinafter referred to as a vehicle speed V), and the information receiver 25 may receive external information. The ACC switch 22 may be provided on the instrument panel or the steering wheel, for example, to be readily operated by the driver's operation. The ACC switch 22 may be a composite switch used to switch between normal driving (OFF) and ACC driving (ON) and to set a vehicle speed in the ACC driving.

The information receiver 25 may acquire information on preceding vehicles and oncoming vehicles via an inter-vehicle communication or a road-to-vehicle communication. Further, the information receiver 25 may access a cloud server to retrieve dynamic information on a dynamic map from the cloud server, and acquire the information on preceding vehicles and oncoming vehicles from the dynamic information. Note that the information on preceding vehicles and oncoming vehicles may include information on positions and vehicle speeds of the preceding vehicles and the oncoming vehicles.

An engine drive actuator 31 may be coupled to an output terminal of the E/G_ECU 12. The engine drive actuator 31 may open and close a throttle valve. The E/G_ECU 12 may achieve a desired engine output by controlling an operation of the engine drive actuator 31 to regulate an intake air amount.

A motor drive inverter 32 may be coupled to an output terminal of the motor_ECU 13. The traveling motor may be driven via the motor drive inverter 32. A brake actuator 33 may be coupled to an output terminal of the Br_ECU 14. The brake actuator 33 may regulate the pressure of brake fluid to be fed to a brake wheel cylinder of each drive wheel. In response to a drive signal from the Br_ECU 14, the brake actuator 33 may be driven to cause the brake wheel cylinders to generate a brake force in each drive wheel. This forcibly decelerates the vehicle M.

The BAT_ECU 15 may manage a remaining capacity and an input/output power capacity of a traveling battery 34. The remaining capacity may be the state of charge (SOC) of the traveling battery 34. The input/output power capacity may be a maximum amount of power to be inputted in or outputted from the traveling battery 34. The HEV_ECU 16 may set a traveling mode in accordance with a traveling state of the vehicle M. The traveling modes may include an engine traveling mode (hereinafter referred to as an E/G mode) in which the vehicle M is driven only by the engine, a motor traveling mode (hereinafter referred to as an EV mode) in which the vehicle M is driven only by the traveling motor, and a hybrid mode (hereinafter referred to as an HEV mode) in which the vehicle M is driven by both of the engine and the traveling motor. In one embodiment, the HEV_ECU 16 may serve as a "traveling mode changing unit".

When the traveling mode is switched to the E/G mode by the HEV_ECU 16, the vehicle M may be driven to travel only by the engine under the control of the E/G_ECU 12. When the traveling mode is switched to the EV mode by the HEV_ECU 16, the vehicle M is driven to travel only by power running of the traveling motor under the control of the motor_ECU 13. When the traveling mode is switched to the HEV mode by the HEV_ECU 16, the vehicle M is driven to travel by both of the engine and the traveling motor under the control of the E/G_ECU 12 and the motor_ECU 13 operating in cooperation with each other.

When the driver turns on the ACC switch 22 while the vehicle M is traveling, the ACC_ECU 11 may start the ACC driving. In response to the start of the ACC driving, the ACC_ECU 11 may determine whether a preceding vehicle traveling immediately in front of the vehicle M is present on the basis of the front environment information on the surrounding environment acquired by the camera unit 21 and the information receiver 25. If the preceding vehicle F is detected within a predetermined ACC recognition area (e.g., within approximately 100 to 150 meters ahead the vehicle M) and where the preceding vehicle F is traveling at a speed lower than or equal to a set vehicle speed, the vehicle M may be caused to travel following the preceding vehicle F (i.e., preceding-vehicle following control may be performed). In one embodiment, the ACC_ECU 11 may serve as a "preceding vehicle detector", a "course change predictor", an "oncoming vehicle detector", an "oncoming-vehicle arrival-time calculator", a "crossing predictor", a "following-control corrector", and a "target inter-vehicle distance setting unit".

In the preceding-vehicle following control, the ACC_ECU 11 may detect an inter-vehicle distance Lm between the vehicle M and the preceding vehicle F on the basis of the front environment information received from the camera unit 21. The inter-vehicle distance Lm may be determined on the basis of the information on the position of the preceding vehicle F acquired through the inter-vehicle communication between the vehicle M and the preceding vehicle F via the information receiver 25, or the information on the position (the coordinates of the position or the azimuth of the traveling direction) of the preceding vehicle F and the information on the position (the coordinates of the position or the azimuth of the traveling direction) of the vehicle M detected via the road-to-vehicle communication.

On the basis of the inter-vehicle distance Lm between the preceding vehicle F and the vehicle M, the vehicle speed V detected by the vehicle speed sensor 23, or the vehicle speed of the preceding vehicle F, the ACC_ECU 11 may cause the vehicle M to travel following the preceding vehicle F in accordance with the traveling mode set by the HEV_ECU 16 while the E/G_ECU 12 and the motor_ECU 13 are respectively causing the engine drive actuator 31 and the motor drive inverter 32 to perform predetermined operations to keep a target inter-vehicle distance LT. The vehicle speed of the preceding vehicle F may be calculated by adding the vehicle speed V to a relative vehicle speed between the vehicle M and the preceding vehicle F calculated on the basis of the front environment information received from the camera unit 21. Alternatively, the vehicle speed of the preceding vehicle F may be calculated from the information on the position of the preceding vehicle F acquired through the inter-vehicle communication between the vehicle M and the preceding vehicle F via the information receiver 25 or a temporal change in the position information (the coordinates of the position or the azimuth of the traveling direction) of the preceding vehicle F detected through the road-to-vehicle communication.

In a case where the inter-vehicle distance Lm between the preceding vehicle F and the vehicle M is shorter than the target inter-vehicle distance LT by a predetermined distance and where the vehicle M is approaching the preceding vehicle F, the Br_ECU 14 may operate the brake actuator 33 to forcibly decelerate the vehicle M to keep the target inter-vehicle distance LT. In another case where the vehicle M suddenly approaches the preceding vehicle F, automatic emergency braking (AEB) control may be performed to avoid contact with the preceding vehicle F. The AEB control may be performed preferentially over other control in the preceding-vehicle following control.

In contrast, if no preceding vehicle is detected within the ACC recognition area, the ACC_ECU 11 may cause the vehicle M to travel at a set vehicle speed.

After the preceding vehicle F to be followed by the vehicle M traveling on the same traveling lane turns right, the vehicle M is expected to turn right, travel straight, or turn left. The preceding vehicle F may decelerate while traveling straight before turning right, and then turn right. Thus, in the preceding-vehicle following control, the vehicle M may be decelerated while keeping the target inter-vehicle distance LT from the preceding vehicle F, and then stopped when the preceding vehicle F makes a temporary stop.

The fuel economy and the ride quality of the vehicle M may be improved by fuel cutting at an early timing, i.e., by slowly decelerating, rather than stopping, the vehicle M at an early timing so that the vehicle M approaches the preceding vehicle F making a temporary stop. This helps prevent the vehicle M from rapidly approaching the preceding vehicle F without intention. In other words, this suppresses a large change in acceleration or deceleration speed of the vehicle M following the preceding vehicle F, and thus improves the ride quality of the vehicle M. Further, predicting that preceding vehicle F will turn right without making a temporary stop on the straight traveling lane may eliminate the need to forcibly decelerate the vehicle M. This also helps improve the fuel economy and the ride quality of the vehicle M.

Accordingly, the ACC_ECU 11 may predict a right turning movement of the preceding vehicle F to be followed by the vehicle M. If it is predicted that the preceding vehicle F will turn right after making a temporary stop, the ACC_ECU 11 may enlarge the target inter-vehicle distance LT and cause the vehicle M to slowly decelerate and approach the preceding vehicle F. This allows the vehicle M to turn right or travel straight without making a temporary stop.

Figure 2:
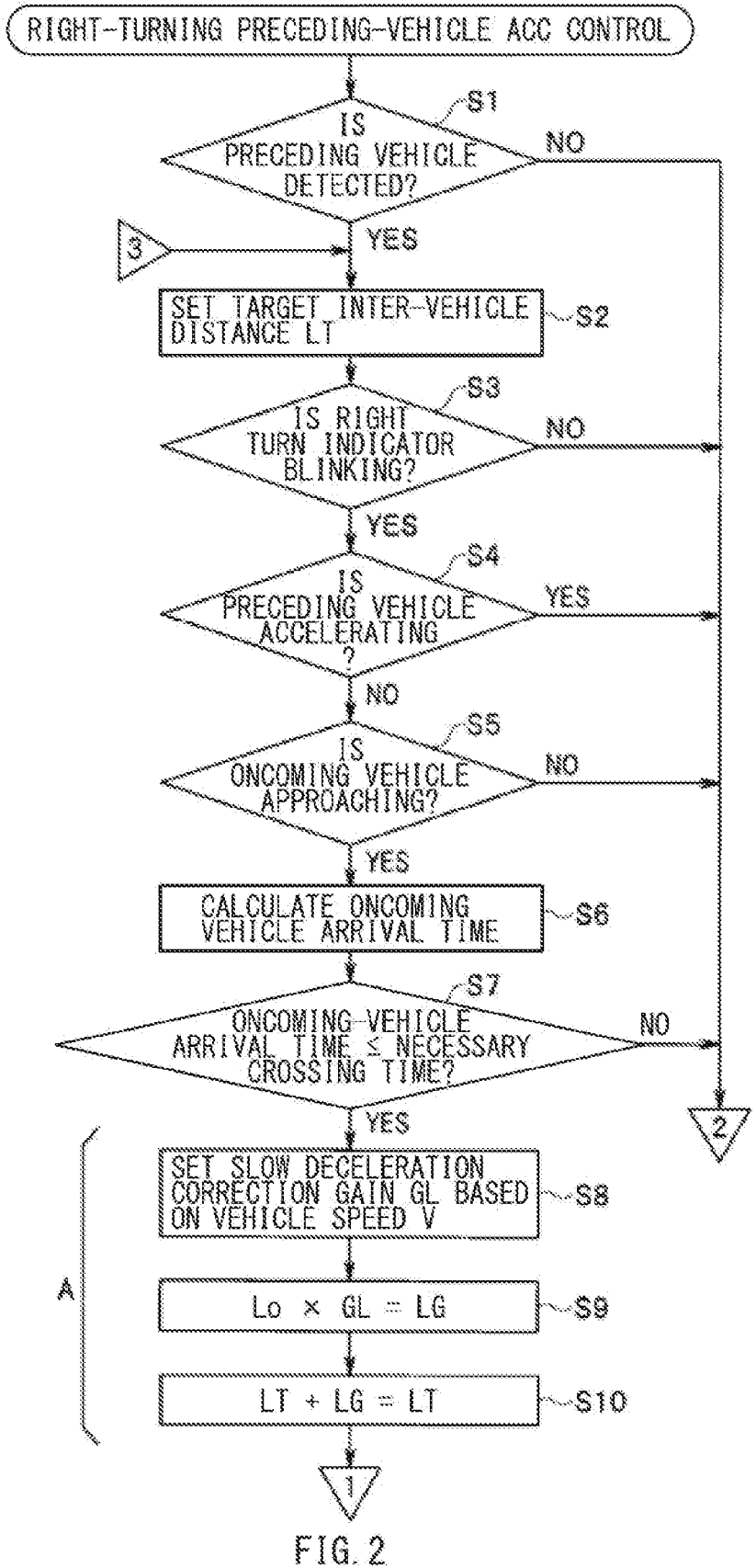
FIG. 2 is a flowchart illustrating steps in a right-turning preceding-vehicle ACC routine according to an example embodiment of the technology.
Figure 3:
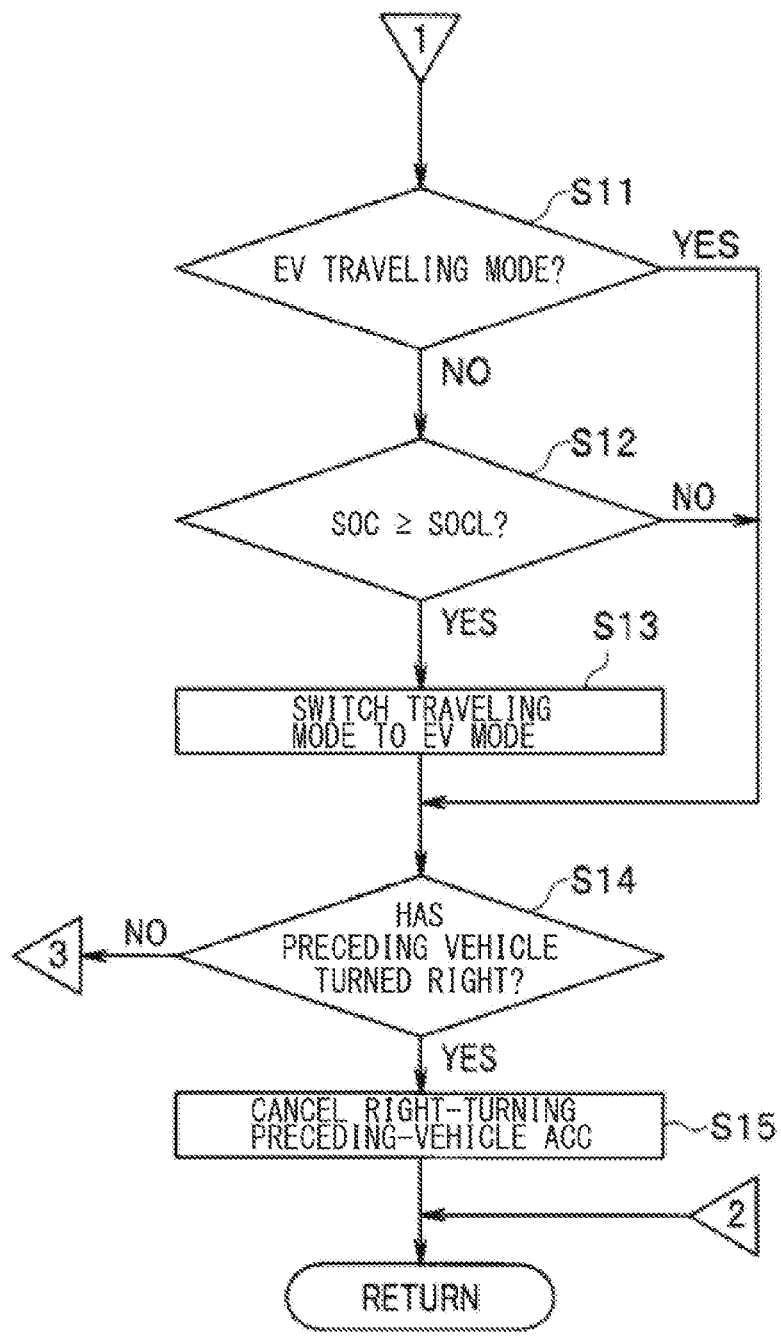
FIG. 3 is a flowchart illustrating steps in the right-turning preceding-vehicle ACC routine subsequent to those illustrated in FIG. 2.

The ACC performed by the ACC_ECU 11 when the preceding vehicle F is going to turn right may follow a right-turning preceding-vehicle ACC routine illustrated in FIGS. 2 and 3, for example. This routine may be a subroutine included in a main routine of ordinary ACC (hereinafter referred to as an ACC main routine) and executed in a predetermined cycle.

The procedure of the routine may start with Step S1 in which the ACC_ECU 11 determines whether the preceding vehicle F traveling immediately in front of the vehicle M and to be followed by the vehicle M is detected on the basis of the front environment information, acquired by the camera unit 21, about the ACC recognition area lying in front of the vehicle M, and the position information acquired via the information receiver 25 through the inter-vehicle communication or the road-to-vehicle communication from the dynamic information on the dynamic map stored in the cloud server. If the preceding vehicle F is detected (Step S1: YES), the procedure may proceed to Step S2. If the preceding vehicle F is not detected (Step S1: NO), the procedure may exit the routine.

In Step S2, the ACC_ECU 11 may calculate the target inter-vehicle distance LT between the vehicle M and the preceding vehicle F on the basis of the vehicle speed V detected by the vehicle speed sensor 23 by using a linear expression with a predetermined intercept and a predetermined slope or by referring to a table stored in the ROM. The target inter-vehicle distance LT may be a target inter-vehicle distance to be kept between the vehicle M and the preceding vehicle F to be followed by the vehicle. Alternatively, the target inter-vehicle distance LT may be set on the basis of the vehicle speed of the preceding vehicle F. The process in Step S2 may correspond to a process performed by the "target inter-vehicle distance setting unit" of one embodiment of the technology.

Figure 4:
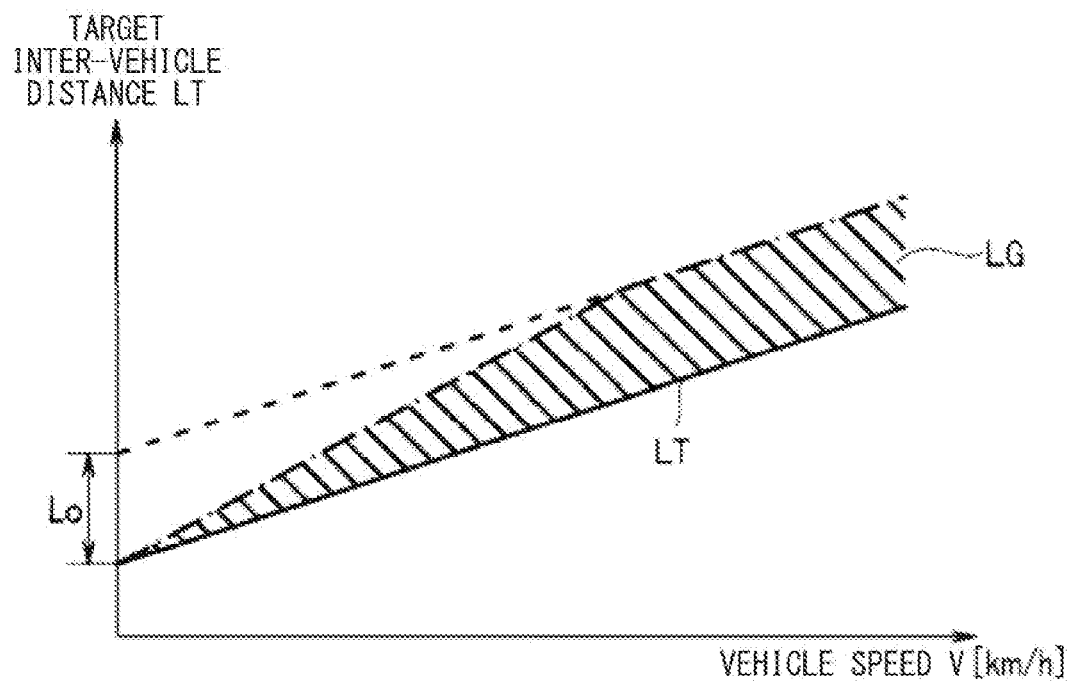
FIG. 4 is a conceptual diagram illustrating a target inter-vehicle distance setting table according to an example embodiment of the technology.

FIG. 4 is a conceptual diagram of a target inter-vehicle distance setting table. The target inter-vehicle distance LT determined in the example embodiment may become longer substantially in proportion to an increase in the vehicle speed V, as indicated by a solid line in FIG. 4. Accordingly, in a case where the preceding vehicle F starts decelerating before the intersection to turn right at the intersection, for example, the ACC_ECU 11 may gradually shorten the target inter-vehicle distance LT in a predetermined calculation cycle. In this case, the target inter-vehicle distance LT may become longer stepwise in accordance with an increase in the vehicle speed V or an increase in the vehicle speed of the preceding vehicle F.

Thereafter, in Step S3, the ACC_ECU 11 may determine whether a right turn indicator (right turn signal) of the preceding vehicle F is turned on on the basis of blinking of a right turn signal indicator provided on a rear portion of the preceding vehicle F recognized by the camera unit 21 or an ON signal of a right turn indicator switch acquired via the inter-vehicle communication between the vehicle M and the preceding vehicle F. If the right turn indicator is blinking (or the ON signal of the right turn indicator switch is detected) (Step S3: YES), the ACC_ECU 11 may predict that the preceding vehicle F will change its course to the right by traveling across the oncoming lane, and cause the procedure to proceed to Step S4. If the right turn indicator is turned off (i.e., an OFF signal of the right turn indicator switch is detected) (Step S3: NO), the ACC_ECU 11 may predict that the preceding vehicle F will not turn right, and cause the procedure to exit the routine. The procedure may then return to the ACC main routine, and the ordinary ACC may be continuously performed to cause the vehicle M to travel following the preceding vehicle F. The process in Step S3 may correspond to a process performed by the "course change predictor" of one embodiment of the technology.

The preceding vehicle F may blink the right turn indicator (turn on the right turn indicator switch) before reaching a right turn point such as the intersection and turn right. Thus, when the vehicle M detects blinking of the right turn indicator (or the ON signal of the right turn indicator switch) for the first time, the preceding vehicle F may be gradually decelerating and traveling toward the right turn point. The preceding vehicle F may then turn right at an appropriate timing depending on the condition of the oncoming vehicle traveling on the oncoming lane. When the preceding vehicle F starts turning right, the ACC_ECU 11 may no longer detect the preceding vehicle F to be followed by the vehicle M. As a result, the procedure may return from Step S1 to the ACC main routine, and the ordinary ACC may be continuously performed.

In Step S4, the ACC_ECU 11 may determine whether the preceding vehicle F is accelerating on the basis of the vehicle speed V and a change in the inter-vehicle distance Lm between the vehicle M and the preceding vehicle F acquired by the camera unit 21. Alternatively, the ACC_ECU 11 may determine whether the preceding vehicle F is accelerating on the basis of a change in the vehicle speed of the preceding vehicle F acquired through the inter-vehicle communication between the vehicle M and the preceding vehicle F via the information receiver 25.

As described above, the preceding vehicle F may decelerate before reaching the right turn point such as the intersection. If no oncoming vehicle is traveling on the oncoming lane, the preceding vehicle F may turn right at the right turn point without making a temporary stop at the right turn point. In contrast, if the oncoming vehicle P1 is approaching the preceding vehicle F, the preceding vehicle F may wait for the oncoming vehicle P1 to pass through the intersection. Accordingly, acceleration of the preceding vehicle F is deemed to mean absence of the oncoming vehicle P1 approaching the preceding vehicle F.

If it is determined that the preceding vehicle F is accelerating (Step S4: YES), the ACC_ECU 11 may predict that the preceding vehicle F will turn right at the right turn point by traveling across the oncoming lane without making a temporary stop at the right turn point. The procedure may thus return to the ACC main routine, and the ordinary ACC may be continuously performed. After the preceding vehicle F turns right, the ACC_ECU 11 may no longer detect the preceding vehicle F to be followed by the vehicle M. Thus, in a case where the vehicle M is going to travel straight, the ACC_ECU 11 may cause the vehicle M to travel at a set vehicle speed under the ordinary ACC. In a case where a new preceding vehicle is detected, the ACC_ECU 11 may perform the preceding-vehicle following control to cause the vehicle M to travel following the detected preceding vehicle. In a case where the vehicle M is going to turn right following the preceding vehicle F, the ACC_ECU 11 may cancel the ACC for a while. The ACC may be restarted in response to a predetermined operation performed by the driver of the vehicle M after the vehicle M turns right.

In contrast, if it is determined that the preceding vehicle F is not accelerating (i.e., the preceding vehicle F is decelerating, traveling slowly, or making a stop) (Step S4: NO), the procedure may proceed to Step S5. In Step S5, the ACC_ECU 11 may determine whether the oncoming vehicle P1 traveling on the oncoming lane is detected. If the oncoming vehicle P1 approaching the preceding vehicle F is detected as illustrated in FIGS. 6 and 7 (Step S5: YES), the procedure may proceed to Step S6. The process in Step S5 may correspond to a process performed by the "oncoming vehicle detecotor" of one embodiment of the technology.

If the oncoming vehicle P1 is not detected as illustrated in FIG. 8 (Step S5: NO), the ACC_ECU 11 may predict that the preceding vehicle F will turn right by traveling across the oncoming lane without making a temporary stop, and causes the procedure to exit the routine. The procedure may return to the ACC main routine, and the ordinary ACC may be continuously performed. The ACC_ECU 11 may determine whether the oncoming vehicle P1 is present on the basis of the front environment information acquired by the camera unit 21 or the position information acquired via the information receiver 25 through the inter-vehicle communication or the road-to-vehicle communication or from the dynamic information on the dynamic map stored in the cloud server.

In Step S6, the ACC_ECU 11 may calculate an estimated arrival time of the oncoming vehicle P1 to the position of the preceding vehicle F (hereinafter referred to as an oncoming-vehicle arrival time) on the basis of the vehicle speed of the oncoming vehicle P1 and the distance between the oncoming vehicle P1 and the preceding vehicle F. The vehicle speed of the oncoming vehicle P1 and the distance between the oncoming vehicle P1 and the preceding vehicle F may be calculated on the basis of the front environment information acquired by the camera unit 21 or the position information acquired via the information receiver through the inter-vehicle communication or the road-to-vehicle communication 25 or from the dynamic information on the dynamic map stored in the cloud server. The process in Step S6 may correspond to a process performed by the "target inter-vehicle distance setting unit" of one embodiment of the technology.

In Step S7, the oncoming-vehicle arrival time may be compared with a necessary crossing time. The necessary crossing time may be a time necessary for the preceding vehicle F to travel from the current traveling lane across the oncoming lane. The necessary crossing time may be a fixed value determined in a preliminary experiment or a variable value calculated from the width of the oncoming lane. If the oncoming-vehicle arrival time is longer than the necessary crossing time (Step S7: NO), the ACC_ECU 11 may predict that the preceding vehicle F will turn right without waiting for the oncoming vehicle P1 to pass through the intersection. The procedure may then return to the ACC main routine, and the ordinary ACC may be continuously performed. In contrast, if the oncoming-vehicle arrival time is shorter than or equal to the necessary crossing time (Step S7: YES), the ACC_ECU 11 may predict that the preceding vehicle F will not turn right before the oncoming vehicle P1 passes through the intersection. The procedure may then proceed to Step S8. The process in Step S7 may correspond to a process performed by the "crossing predictor" of one embodiment of the technology.

After Step S7, the procedure may enter a processing routine A including Steps S8 to S10 in which a following control correction process is performed. The process in Steps S8 to S10 may correspond to a process performed by the "following-control corrector" of one embodiment of the technology.

In Step S8, the ACC_ECU 11 may set a slow deceleration correction gain GL on the basis of the vehicle speed V detected by the vehicle speed sensor 23. The slow deceleration correction gain GL may be a percentage of the decrease in a reference slow deceleration increment distance Lo described later depending on the vehicle speed V. As illustrated in FIG. 5, the slow deceleration correction gain GL may be lowered in proportion to a decrease in the vehicle speed V when the vehicle speed V is lower than or equal to a certain vehicle speed, for example, 60 km/h. Accordingly, when the vehicle speed V is 0 km/h, the slow deceleration correction gain GL may be 0%.

In Step S9, the ACC_ECU 11 may read the reference slow deceleration increment distance Lo. The reference slow deceleration increment distance Lo may be multiplied by the slow deceleration correction gain GL to obtain a slow deceleration increment distance LG (Lo×GL=LG). Thereafter, the procedure may proceed to Step S10. The reference slow deceleration increment distance Lo may be a default value with which the target inter-vehicle distance LT set in Step S2 is increased. For example, the reference slow deceleration increment distance Lo may be a fixed value determined in a preliminary experiment and may be approximately 8 to 15 meters. The slow deceleration increment distance LG obtained by multiplying the reference slow deceleration increment distance Lo by the slow deceleration correction gain GL may have a smaller value as the vehicle speed V decreases. Accordingly, the slow deceleration increment distance LG may be a reasonable value determined on the basis of the vehicle speed V.

In Step S10, the slow deceleration increment distance LG may be added to the target inter-vehicle distance LT to determine a new target inter-vehicle distance LT as a new value (LT+LG=LT).

The new target inter-vehicle distance LT set for the first time may be longer than the regular target inter-vehicle distance LT by the slow deceleration increment distance LG. Therefore, the vehicle speed V of the vehicle M following the preceding vehicle F may be decelerated to keep the new target inter-vehicle distance LT therebetween. The vehicle M may be decelerated by engine braking or regenerative braking. However, if there is no difference in the vehicle speed between the preceding vehicle F and the vehicle M, the vehicle M may be decelerated by forcible braking using the brake actuator 35 under the control of the Br_ECU 14.

Accordingly, the vehicle M may be caused to travel following the preceding vehicle F while being decelerated at a slow deceleration rate depending on the vehicle speed V. This helps prevent the vehicle M from being rapidly decelerated. Accordingly, it is possible to improve the fuel economy and the ride quality of the vehicle M.

When the vehicle M is decelerated following the preceding vehicle F, the new target inter-vehicle distance LT may be set to be longer than the regular target inter-vehicle distance Lt by the slow deceleration increment distance LG at first, as indicated by a dashed-dotted line in FIG. 4. The slow deceleration correction gain GL may then be gradually decreased as the vehicle speed V decreases toward 0 km/h. Accordingly, when the vehicle speed V is 0 km/h, the slow deceleration correction gain GL may be 0%, and the slow deceleration increment distance LG may be 0 meters. The traveling time in which the vehicle M is decelerated may be longer while the slow deceleration increment distance LG decreases from the reference slow deceleration increment distance Lo to zero (0) than while the vehicle M is traveling with keeping the regular target inter-vehicle distance LT set in Step S2. Accordingly, the vehicle M may be decelerated at a relatively slow deceleration speed.

When the vehicle M makes a stop following the preceding vehicle F, the inter-vehicle distance Lm between the vehicle M and the preceding vehicle F may be equal to the target inter-vehicle distance LT set in Step S2. This helps prevent the inter-vehicle distance Lm from being increased more than necessary and thus helps prevent the driver from feeling uncomfortable.

The ACC_ECU 11 may control the vehicle speed V of the vehicle M following the preceding vehicle F so that the inter-vehicle distance Lm converges to the target inter-vehicle distance LT. For example, the ACC_ECU 11 may determine which traveling mode (out of the E/G mode, the EV mode, and the HEV mode) the HEV_ECU 16 has set, and send a control signal to the E/G_ECU 12 and/or the motor_ECU 13 on the basis of the traveling mode set by the HEV_ECU 16. The ACC_ECU 11 may further send a control signal to the Br_ECU 14 to control the vehicle speed.

In Step S11, the ACC_ECU 11 may determine if the traveling mode set by the HEV_ECU 16 is the EV mode. If the traveling mode set by the HEV_ECU 16 is the EV mode (Step S11: YES), the procedure may jump to Step S14. In contrast, if the traveling mode set by the HEV_ECU 16 is the E/G mode or the HEV mode (Step S11: NO), the procedure may proceed to Step S12. The process in Step S11 may correspond to a process performed by the "traveling mode determination unit" of one embodiment of the technology.

In Step S12, the ACC_ECU 11 may read the SOC of the traveling battery 34 detected by the BAT_ECU15. The SOC of the traveling battery 34 may be compared with a predetermined lowest state of charge (SOCL), which may be 25% to 40%, for example. If the SOC is greater than or equal to the SOCL (Step S12: YES), the ACC_ECU 11 may determine that it is possible to cause the vehicle M to travel in the EV mode. The procedure may thus proceed to Step S13. In contrast, if the SOC is less than SOCL (Step S12: NO), the ACC_ECU 11 may determine that the SOC is insufficient. The procedure may then jump to Step S14 while the traveling mode currently set is maintained.

In Step S13, the ACC_ECU 11 may send a command signal to the HEV_ECU 16 to switch the traveling mode to the EV mode. In response to the command signal, the HEV_ECU 16 may switch the traveling mode to the EV mode, so that the vehicle M is caused to travel in the traveling mode under the control of the motor_ECU 13. Such switching of the traveling mode of the vehicle M to the EV mode at an early timing reduces the amount of fuel consumption and thus improves the fuel economy. The process in Step S13 may correspond to a process performed by the "traveling mode switching unit" of one embodiment of the technology.

When the procedure proceeds from Step S11, S12, or S13 to Step S14, the ACC_ECU 11 may determine whether the preceding vehicle F has turned right. The ACC_ECU 11 may determine whether the preceding vehicle F has turned right on the basis of the front environment information acquired by the camera unit 21 or a temporal change in the position information acquired via the information receiver 25 through the inter-vehicle communication or the road-to-vehicle communication.

If the preceding vehicle F has not been turned right yet (Step S14: NO), the procedure may return to Step S2 in which the target inter-vehicle distance LT may be set again. In contrast, if the preceding vehicle F has turned right (Step S14: YES), the ACC_ECU 11 may no longer detect the preceding vehicle F to be followed by the vehicle M. The procedure may thus proceed to Step S15 in which the right-turning preceding-vehicle ACC currently executed is cancelled. The procedure may then return to the ACC main routine in which the ordinary ACC is executed. If a new preceding vehicle is detected in the ACC recognition area while the vehicle M is traveling straight or after the vehicle M turns right, for example, the ACC control may be executed that causes the vehicle M to travel following the detected preceding vehicle. In contrast, if no new preceding vehicle is detected, the ACC control may be executed that causes the vehicle M to travel a set vehicle speed.

In an example case illustrated in FIG. 6 where the preceding vehicle F and the vehicle M following the preceding F are going to turn right at the intersection and where the estimated arrival time of the oncoming vehicle P1 is shorter than the necessary crossing time, the ACC_ECU 11 may predict that the preceding vehicle F will turn right after waiting for the oncoming vehicle P1 to pass through the intersection. Accordingly, the new target inter-vehicle distance LT may be set to be longer than the regular target inter-vehicle distance LT by the slow deceleration increment distance LG (LT+LG=LT). This causes the vehicle M to approach the preceding vehicle F at a slow deceleration speed or a low deceleration rate. In a case where the oncoming vehicle P2 following the oncoming vehicle P1 is detected as illustrated in FIG. 6, the ACC_ECU 11 may predict, in Steps S5 and S6, whether the preceding vehicle F will turn right after waiting for the oncoming vehicle P2 to pass through the intersection or will turn right before the oncoming vehicle P2 passes through the intersection.

In another example case illustrated in FIG. 7 where the vehicle M is traveling straight on a road with a single lane in each direction and where the preceding vehicle F going to turn right and the oncoming vehicle P1 approaching the preceding vehicle F are detected, the ACC_ECU 11 may predict, in Steps S5 and S6, whether the preceding vehicle F will turn right after waiting for the oncoming vehicle P1 to pass by the crossing road or will turn right before the oncoming vehicle P1 passes by the crossing road. The target inter-vehicle distance LT may be set to be longer, and the vehicle M may be thereby caused to approach the preceding vehicle F at the slow deceleration speed. If the oncoming vehicle P1 passes by the crossing road before the vehicle M stops, the vehicle M may keep traveling under the ACC without making a stop. This achieves stable traveling control.

In an example case illustrated in FIG. 8, the preceding vehicle F going to turn right to enter the crossing road may decelerate with the right turn indicator blinking before reaching the crossing road. If no oncoming vehicle is detected on the oncoming lane, the preceding vehicle F may travel across the oncoming lane to enter the crossing road at an accelerated speed without making a stop. In such a case, the procedure may return from Step S4 or S5 to the ACC main routine in which the ordinary ACC is performed. This helps prevent the target inter-vehicle distance LT from being increased more than necessary and thus helps prevent the driver from feeling uncomfortable.

According to the first example embodiment described above, the estimated arrival time of the oncoming vehicle P1 is determined in a case where the preceding vehicle F to be followed by the vehicle M is going to change its course (turn right) by traveling across the oncoming lane and where the oncoming vehicle P1 approaching the preceding vehicle F is detected on the oncoming lane. Further, it is predicted whether the preceding vehicle F will make a temporary stop to wait for oncoming vehicle P1 to pass through or will change its course without waiting for the oncoming vehicle P1 to pass through. If it is predicted that the preceding vehicle F will make a temporary stop, the new target inter-vehicle distance LT, which is longer than the regular target inter-vehicle distance LT, may be set. As a result, the vehicle M is caused to approach the preceding vehicle F at a slow deceleration speed. Accordingly, it is possible to improve the ride quality while preventing the vehicle M from being rapidly decelerated. Further, as slowly decelerating the vehicle M increases the fuel cut time, it is possible to improve the fuel economy.

In contrast, if it is predicted that the preceding vehicle F will change its course without waiting for the oncoming vehicle P1 to pass through, the vehicle M traveling straight may be allowed to continuously travel under the ACC without being stopped. This achieves stable traveling control.

Second Example Embodiment

Figure 9:
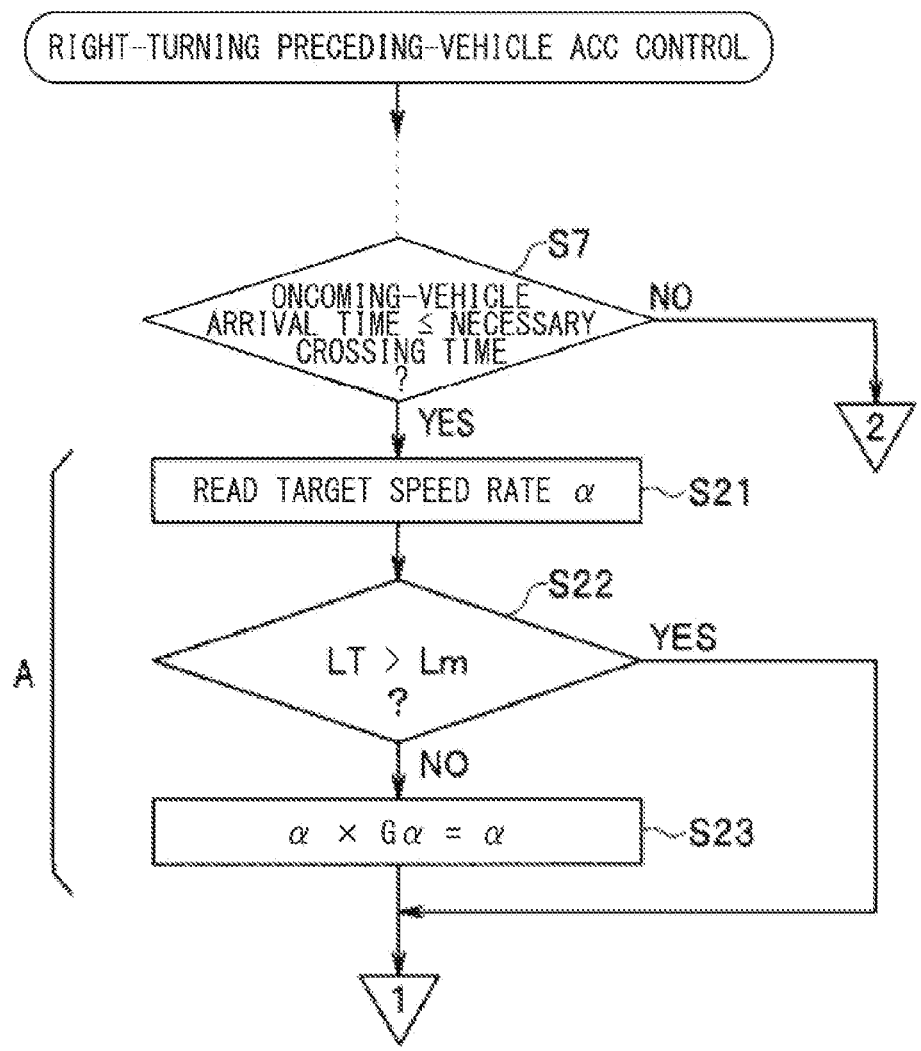
FIG. 9 is a flowchart illustrating a main part of the right-turning preceding-vehicle ACC routine illustrated in FIG. 2 according to one embodiment of the technology.

A second example embodiment of the technology will now be described with reference to FIG. 9. In the first example embodiment described above, if it is predicted that the preceding vehicle F will turn right after waiting for the oncoming vehicle P1 to pass through, the new target inter-vehicle distance LT may be set which is longer than the regular target inter-vehicle distance by the slow deceleration increment distance LG to decelerate the vehicle M at an early timing. In the second example embodiment, if it is predicted that the preceding vehicle F will turn right after waiting for the oncoming vehicle P1 to pass through, the acceleration rate of the vehicle M approaching the preceding vehicle F may be regulated. Hereinafter, components the same as those in the first example embodiment are denoted with the same reference numerals to simplify or omit the description on the components.

The traveling processor 1 according to the second example embodiment may have the same configuration as the traveling processor 1 according to the first example embodiment illustrated in FIG. 1. The right-turning preceding-vehicle ACC control routine executed by the ACC_ECU 11 of the traveling processor 1 according to the second example embodiment may be the same as the right-turning preceding-vehicle ACC according to the first example embodiment illustrated in FIG. 2 except the processing routine A in which the following control correction process is performed. Therefore, descriptions on the other steps than the steps of the processing routine A are omitted herein.

If it is determined that the oncoming-vehicle arrival time is shorter than or equal to the necessary crossing time in Step S7 of the right-turning preceding-vehicle ACC routine (Step S7: YES), the ACC_ECU 11 may predict that the preceding vehicle F will not turn right before the oncoming vehicle P1 passes through. The procedure may then proceed to Step S21 in which a target speed rate α set in the ACC main routine is read. The target speed rate α may be determined on the basis of the difference between the target inter-vehicle distance LT and the actual inter-vehicle distance Lm, for example. If the target inter-vehicle distance LT is longer than the actual inter-vehicle distance Lm, the target speed rate α may be set to a deceleration rate on the basis of the difference between the target inter-vehicle distance LT and the actual inter-vehicle distance Lm. If the target inter-vehicle distance LT is shorter than or equal to the actual inter-vehicle distance Lm, the target speed rate α may be set to an acceleration rate on the basis of the difference between the target inter-vehicle distance LT and the actual inter-vehicle distance Lm. The actual inter-vehicle distance Lm is thereby maintained at the target inter-vehicle distance LT.

In Step S22, it may be determined whether the target inter-vehicle distance LT is longer than the actual inter-vehicle distance Lm. If the target inter-vehicle distance LT is shorter than or equal to the actual inter-vehicle distance Lm (Step S22: NO), the target speed rate α may be set to a value on an acceleration side. The procedure may then proceed to Step S23. In contrast, if the target inter-vehicle distance LT is longer than the actual inter-vehicle distance Lm (Step S22: YES), the target speed α a is set to a value on a deceleration side. The procedure may then proceed to Step S11 illustrated in FIG. 3 without setting a new target speed rate α.

In Step S23, the target speed rate α may be multiplied by a predetermined speed gain Ga that regulates the acceleration rate to determine a new target speed rate α as a new value (i.e., α×Ga=α). The procedure may then proceed to Step S11 in FIG. 3.

If the actual inter-vehicle distance Lm is longer than or equal to the target inter-vehicle distance LT (i.e., LT≤Lm), the target speed rate α may be set to a value on the acceleration side. However, the target speed rate α may be regulated by the speed gain Ga in Step S23. Thus, in a case where the preceding vehicle F decelerates to turn right, the vehicle M may be caused to travel following the preceding vehicle F at a regulated acceleration rate. This causes the actual inter-vehicle distance Lm to converge to the target inter-vehicle distance LT at a delayed timing.

In contrast, if the actual inter-vehicle distance Lm is shorter than the target inter-vehicle distance LT (LT>Lm), the target speed rate α may be set to a value on the deceleration side. In this case, if the preceding vehicle F has been already decelerated to turn right, the actual inter-vehicle distance Lm can become much shorter than the target inter-vehicle distance LT. This can generate the necessity to decelerate the vehicle M at a high deceleration rate. However, if the target speed rate α is regulated using the speed gain Ga in Step S23 under such a condition, the deceleration rate of the vehicle M can be lowered, and the actual inter-vehicle distance Lm can be gradually shortened without converging to the target inter-vehicle distance LT due to the delay of control.

To prevent the delay of control, the procedure may proceed to Step S11 in a case where the target speed rate α is set to a value on the deceleration side. The processes in Steps S21 to S23 may correspond to processes performed by the "following-control corrector" of one embodiment of the technology.

Accordingly, in a case where the actual inter-vehicle distance Lm is longer than or equal to the target inter-vehicle distance LT (i.e., LT≤Lm), the time until the inter-vehicle distance Lm converges at the target inter-vehicle distance LT becomes longer, and the vehicle M is caused to approach the preceding vehicle F at a regulated acceleration rate. Even if the preceding vehicle F accelerates, the vehicle M is caused to travel following the preceding vehicle F at the regulated acceleration rate. This suppresses an occurrence of a large change in the acceleration/deceleration rate of the vehicle M following the preceding vehicle F going to turn right. Therefore, it is possible to improve the ride quality of the vehicle M. Further, the vehicle M is prevented from being rapidly accelerated. Therefore, it is also possible to improve the fuel economy of the vehicle M.

It should be noted that the foregoing example embodiments are non-limiting examples. For example, the right-turning preceding-vehicle ACC illustrated in FIGS. 2 and 9 may be also applied to automated driving of the vehicle M along a target traveling course.

According to the foregoing example embodiments of the technology, in a case where it is predicted that the preceding vehicle to be followed by the vehicle will change its course and where the oncoming vehicle approaching the preceding vehicle is detected, the estimated arrival time of the oncoming vehicle to the position of the preceding vehicle is calculated. The estimated arrival time is compared with the necessary crossing time necessary for the preceding vehicle to travel across the oncoming lane. If the estimated arrival time is shorter than the necessary crossing time, it is predicted that the preceding vehicle will not travel across the oncoming lane, and the vehicle is caused to approach the preceding vehicle at a low acceleration rate or a low deceleration rate. In a case where the preceding vehicle to be followed by the vehicle is going to change its course by traveling across the oncoming lane, it is predicted whether the preceding vehicle will make a temporary stop or will change its course without making a temporary stop. On the basis of the prediction, the ACC is executed in an appropriate manner. Accordingly, it is possible to improve the fuel economy and the ride quality of the vehicle.

One or more of the preceding vehicle detector, the course change predictor, the oncoming vehicle detector, the oncoming-vehicle arrival-time calculator, the crossing predictor, and the following-control corrector in the ACC_ECU 11 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the preceding vehicle detector, the course change predictor, the oncoming vehicle detector, the oncoming-vehicle arrival-time calculator, the crossing predictor, and the following-control corrector. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the preceding vehicle detector, the course change predictor, the oncoming vehicle detector, the oncoming-vehicle arrival-time calculator, the crossing predictor, and the following-control corrector in the ACC_ECU 11 illustrated in FIG. 1.

The invention claimed is:

1. A traveling control apparatus for a vehicle, the traveling control apparatus comprising:
   a preceding vehicle detector configured to detect a preceding vehicle to be followed by the vehicle;
   a course change predictor configured to predict a course change of the preceding vehicle in a direction crossing an oncoming lane;
   an oncoming vehicle detector configured to detect an oncoming vehicle traveling on the oncoming lane and approaching the preceding vehicle;
   an oncoming-vehicle arrival-time calculator configured to calculate an estimated arrival time of the oncoming vehicle to a position of the preceding vehicle in a case where the course change predictor predicts that the preceding vehicle attempts to travel across the oncoming lane and where the oncoming vehicle detector detects the oncoming vehicle approaching the preceding vehicle;

a crossing predictor configured to
  compare the estimated arrival time calculated by the oncoming-vehicle arrival-time calculator with a necessary crossing time necessary for the preceding vehicle that attempts to travel across the oncoming lane to travel across the oncoming lane, and
  predict, in a case where the estimated arrival time is shorter than the necessary crossing time, that the preceding vehicle that attempts to travel across the oncoming lane will not travel across the oncoming lane;
a target inter-vehicle distance setting unit configured to set a target inter-vehicle distance between the preceding vehicle and the vehicle;
a following-control corrector configured to lower a deceleration rate of the vehicle approaching the preceding vehicle by adding an increment distance to the target inter-vehicle distance set by the target inter-vehicle distance setting unit to determine a new target inter-vehicle distance and setting the new target inter-vehicle distance as a new value, in a case where the crossing predictor predicts that the preceding vehicle that attempts to travel across the oncoming lane will not travel across the oncoming lane; and
a traveling mode switching unit, wherein:
the vehicle comprises a hybrid vehicle including at least a traveling motor as a drive source, and
in a case where the new value is set by the following-control corrector, the traveling mode switching unit is configured to set a traveling mode in which the vehicle is driven only by the traveling motor.

2. The traveling control apparatus for a vehicle according to claim 1, wherein
the following-control corrector is configured to
gradually shorten the increment distance as a vehicle speed of the vehicle decreases, and
set the increment distance to zero when the vehicle speed of the vehicle is zero.

3. A traveling control apparatus for a vehicle, the traveling control apparatus comprising circuitry configured to:
detect a preceding vehicle to be followed by the vehicle,
predict a course change of the preceding vehicle in a direction crossing an oncoming lane,
detect an oncoming vehicle traveling on the oncoming lane and approaching the preceding vehicle,
calculate an estimated arrival time of the oncoming vehicle to a position of the preceding vehicle in a case where the course change of the preceding vehicle is predicted and where the oncoming vehicle approaching the preceding vehicle is detected,
compare the estimated arrival time with a necessary crossing time necessary for the preceding vehicle to travel across the oncoming lane,
predict, in a case where the estimated arrival time is shorter than the necessary crossing time, that the preceding vehicle will not travel across the oncoming lane,
set a target inter-vehicle distance between the preceding vehicle and the vehicle, and
in a case where it is predicted that the preceding vehicle that attempts to travel across the oncoming lane will not travel across the oncoming lane:
  lower a deceleration rate of the vehicle approaching the preceding vehicle by adding an increment distance to the target inter-vehicle distance set by the target inter-vehicle distance setting unit to determine a new target inter-vehicle distance and setting the new target inter-vehicle distance as a new value, in a case where it is predicted that the preceding vehicle will not travel across the oncoming lane, or
  lower an acceleration rate of the vehicle approaching the preceding vehicle by regulating a target speed rate set to a value on an acceleration side to determine a new target speed rate, and setting the new target speed rate as a new value, in a case where an actual inter-vehicle distance is longer than the target inter-vehicle distance set by the target inter-vehicle distance setting unit, wherein:
the vehicle comprises a hybrid vehicle including at least a traveling motor as a drive source, and
in a case where the new value is set, a traveling mode in which the vehicle is driven only by the traveling motor is set.

4. A traveling control apparatus for a vehicle, the traveling control apparatus comprising:
a preceding vehicle detector configured to detect a preceding vehicle to be followed by the vehicle;
a course change predictor configured to predict a course change of the preceding vehicle in a direction crossing an oncoming lane;
an oncoming vehicle detector configured to detect an oncoming vehicle traveling on the oncoming lane and approaching the preceding vehicle;
an oncoming-vehicle arrival-time calculator configured to calculate an estimated arrival time of the oncoming vehicle to a position of the preceding vehicle in a case where the course change predictor predicts that the preceding vehicle attempts to travel across the oncoming lane and where the oncoming vehicle detector detects the oncoming vehicle approaching the preceding vehicle;
a crossing predictor configured to
  compare the estimated arrival time calculated by the oncoming-vehicle arrival-time calculator with a necessary crossing time necessary for the preceding vehicle that attempts to travel across the oncoming lane to travel across the oncoming lane, and
  predict, in a case where the estimated arrival time is shorter than the necessary crossing time, that the preceding vehicle that attempts to travel across the oncoming lane will not travel across the oncoming lane;
a target inter-vehicle distance setting unit configured to set a target inter-vehicle distance between the preceding vehicle and the vehicle;
a following-control corrector configured to lower an acceleration rate of the vehicle approaching the preceding vehicle by regulating a target speed rate set to a value on an acceleration side to determine a new target speed rate, and setting the new target speed rate as a new value, in a case where an actual inter-vehicle distance is longer than the target inter-vehicle distance set by the target inter-vehicle distance setting unit; and
a traveling mode switching unit, wherein:
the vehicle comprises a hybrid vehicle including at least a traveling motor as a drive source, and
in a case where the new value is set by the following-control corrector, the traveling mode switching unit is configured to set a traveling mode in which the vehicle is driven only by the traveling motor.

* * * * *